(12) United States Patent
Chang et al.

(10) Patent No.: US 11,467,415 B1
(45) Date of Patent: Oct. 11, 2022

(54) VIEWER INPUT-BASED CONTROL IN A MULTI-IMAGE AUGMENTED REALITY HEAD UP DISPLAY SYSTEM IN A VEHICLE

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/381,924

(22) Filed: Jul. 21, 2021

(51) Int. Cl.
| | |
|---|---|
| *G02B 27/01* | (2006.01) |
| *G09G 3/00* | (2006.01) |
| *G06F 3/01* | (2006.01) |
| *G02B 27/00* | (2006.01) |
| *B60K 35/00* | (2006.01) |

(52) U.S. Cl.
CPC .......... *G02B 27/0179* (2013.01); *B60K 35/00* (2013.01); *G02B 27/0093* (2013.01); *G02B 27/0101* (2013.01); *G06F 3/011* (2013.01); *G09G 3/002* (2013.01); *B60K 2370/1529* (2019.05); *B60K 2370/334* (2019.05); *B60K 2370/52* (2019.05); *G02B 2027/014* (2013.01); *G09G 2340/04* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 10,613,325 B2* | 4/2020 | Matsuzaki | B60K 35/00 |
| 11,169,377 B1* | 11/2021 | Chen | G02B 27/0101 |
| 2018/0124364 A1* | 5/2018 | Yata | H04N 9/3167 |
| 2018/0164976 A1* | 6/2018 | Ho | G07B 1/00 |
| 2019/0011712 A1* | 1/2019 | Nagano | G09G 3/001 |

FOREIGN PATENT DOCUMENTS

| | | | | |
|---|---|---|---|---|
| JP | 2020047289 A | * | 3/2020 | B60R 1/00 |
| WO | WO-2022024962 A1 | * | 2/2022 | |

* cited by examiner

*Primary Examiner* — Jwalant Amin
(74) *Attorney, Agent, or Firm* — Cantor Colburn LLP

(57) ABSTRACT

A system to provide a multi-image head up display (HUD) in a vehicle includes a fixed mirror to project a far-plane image at a first distance from an occupant of the vehicle. Control of a position of display of the far-plane image is based on an eye height position of the occupant. The system also includes a rotatable mirror to project a near-plane image at a second distance, closer than the first distance, from the occupant. Control of a position of display of the near-plane image is based on a manual adjustment of a rotational angle of the rotatable mirror by the occupant. Processing circuitry automatically adjusts the position of display of the far-plane image based on inferring the eye height position of the occupant from the rotational angle of the rotatable mirror that controls the display of the near-plane image.

20 Claims, 4 Drawing Sheets

VIEWER INPUT-BASED CONTROL IN A MULTI-IMAGE AUGMENTED REALITY HEAD UP DISPLAY SYSTEM IN A VEHICLE

INTRODUCTION

The subject disclosure relates to a viewer input-based control in a multi-image augmented reality (AR) head up display (HUD) system in a vehicle.

A HUD in a vehicle (e.g., automobile, truck, motorcycle) is a transparent image projected at some distance in front of the viewer (e.g., driver). A multi-image HUD, also referred to as a multi-depth display, projects different images at different distances in front of the viewer. For example, a far-plane transparent image may provide one type of information (e.g., navigation) while a near-plane transparent image may provide another type of information (e.g., speedometer reading). An AR HUD refers to the fact that the projected image may add text, color, or another indication as an overlay to the real-world view. When one or both of the images of a multi-image AR HUD are not displayed at a height corresponding with an eye level of the driver, the experience can be frustrating rather than helpful to the driver. Accordingly, it is desirable to provide viewer input-based control in a multi-image AR HUD system in a vehicle.

SUMMARY

In one exemplary embodiment, a system to provide a multi-image head up display (HUD) in a vehicle includes a fixed mirror to project a far-plane image at a first distance from an occupant of the vehicle. Control of a position of display of the far-plane image is based on an eye height position of the occupant. The system also includes a rotatable mirror to project a near-plane image at a second distance, closer than the first distance, from the occupant. Control of a position of display of the near-plane image is based on a manual adjustment of a rotational angle of the rotatable mirror by the occupant. Processing circuitry automatically adjusts the position of display of the far-plane image based on inferring the eye height position of the occupant from the rotational angle of the rotatable mirror that controls the display of the near-plane image.

In addition to one or more of the features described herein, the processing circuitry maps a rotational angle of the rotatable mirror to the eye height position.

In addition to one or more of the features described herein, the processing circuitry uses the eye height position mapped from the rotation angle of the rotatable mirror to control the position and a size of the display of the far-plane image.

In addition to one or more of the features described herein, the system also includes a mirror controller operable by the occupant to control the rotational angle of the rotatable mirror.

In addition to one or more of the features described herein, the system also includes a vehicle controller to obtain feedback from the occupant.

In addition to one or more of the features described herein, the processing circuitry automatically increases or decreases the eye height position used to control the display of the far-plane image based on the feedback from the occupant.

In addition to one or more of the features described herein, the system also includes one or more sensors to obtain position information of the occupant.

In addition to one or more of the features described herein, the one or more sensors includes a pressure sensor to obtain information indicating a decrease in eye height of the occupant.

In addition to one or more of the features described herein, the processing circuitry automatically decreases the eye height position used to control the position of the display of the far-plane image by a predefined amount based on the information from the pressure sensor.

In addition to one or more of the features described herein, the eye height position that controls the position of the display of the far-plane image is stored for a subsequent display of the far-plane image.

In another exemplary embodiment, a method of providing a multi-image head up display (HUD) in a vehicle includes positioning a fixed mirror to project a far-plane image at a first distance from an occupant of the vehicle. Control of a position of display of the far-plane image is based on an eye height position of the occupant. The method also includes disposing a rotatable mirror to project a near-plane image at a second distance, closer than the first distance, from the occupant. Control of a position of display of the near-plane image is configured to be based on a manual adjustment of a rotational angle of the rotatable mirror by the occupant. Processing circuitry automatically adjusts the position of display of the far-plane image based on inferring the eye height position of the occupant from the rotational angle of the rotatable mirror that controls the display of the near-plane image.

In addition to one or more of the features described herein, the method also includes configuring the processing circuitry to map a rotational angle of the rotatable mirror to the eye height position.

In addition to one or more of the features described herein, the method also includes configuring the processing circuitry to use the eye height position mapped from the rotation angle of the rotatable mirror to control the position and a size of the display of the far-plane image.

In addition to one or more of the features described herein, the method also includes arranging a mirror controller operable by the occupant to control the rotational angle of the rotatable mirror.

In addition to one or more of the features described herein, the method also includes configuring a vehicle controller to obtain feedback from the occupant.

In addition to one or more of the features described herein, the method also includes configuring the processing circuitry to automatically increase or decrease the eye height position used to control the display of the far-plane image based on the feedback from the occupant.

In addition to one or more of the features described herein, the method also includes disposing one or more sensors to obtain position information of the occupant.

In addition to one or more of the features described herein, the one or more sensors includes a pressure sensor and the method includes configuring the pressure sensor to obtain information indicating a decrease in eye height of the occupant.

In addition to one or more of the features described herein, the method also includes configuring the processing circuitry to automatically decrease the eye height position used to control the position of the display of the far-plane image by a predefined amount based on the information from the pressure sensor.

In addition to one or more of the features described herein, the method also includes storing the eye height position that controls the position of the display of the far-plane image for a subsequent display of the far-plane image.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
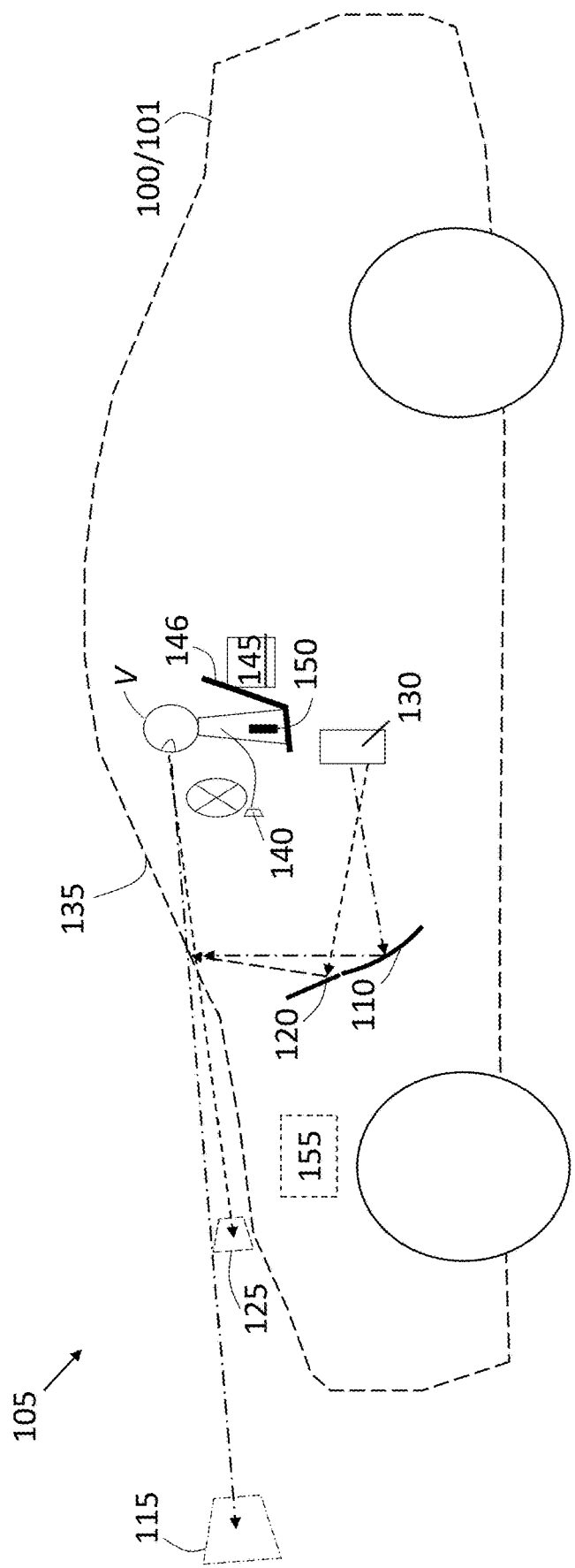
FIG. 1 is a block diagram of a vehicle that provides viewer input-based control in a multi-image augmented reality (AR) head up display (HUD) system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a HUD display in a vehicle is an image projected in the view of a viewer (e.g. driver). A multi-image HUD refers to two images projected at two distances, and an AR HUD refers to the fact that one of those images may augment a real-world view such as the view that the driver sees through the windshield of the vehicle, for example. Generally, in a system that provides both near-plane and far-plane images, a mirror used to position the near-plane image may be adjusted by the driver while another, curved mirror used to position the far-plane image is fixed. According to a prior approach, a real-time eye tracking system is used to determine a position of an eye of the driver. This information is used to automatically control the portion on the fixed curved mirror that is used to provide the far-plane image.

Embodiments of the systems and methods detailed herein relate to a viewer input-based control in a multi-image AR HUD system in a vehicle. While a driver of the vehicle or a person sitting in the driver seat of an autonomous or semi-autonomous vehicle is discussed for explanatory purposes, the description is not intended to limit the one or more embodiments to any particular position in the vehicle. As detailed, driver input in one or more forms may be used to replace the need for a real-time eye tracking system in determining a position of the eyes of the driver for purposes of controlling a height at which the far-plane image is displayed. One form of driver input is obtained from the driver's positioning of the mirror used to adjust a height at which the near-plane image is displayed. The mirror associated with the near-plane image is rotatable, and each rotational angle is mapped to an eye position or, more particularly, an eye height. Another form of driver input is obtained from requested feedback (e.g., at the end of a drive). In addition, real-time adjustments may be made based on a detected change in the driver's position (e.g. slouching in the seat).

In accordance with an exemplary embodiment, FIG. 1 is a block diagram of a vehicle 100 that provides viewer input-based control in a multi-image AR HUD system 105. The multi-image AR HUD system 105 includes all the components that facilitate a display of the multi-image HUD images (e.g., near-plane image 125 and far-plane image 115). The exemplary vehicle 100 shown in FIG. 1 is an automobile 101 and the exemplary viewer V is the driver. A near-plane image 125 and a far-plane image 115 relative to the viewer V are shown in FIG. 1.

Figure 2:
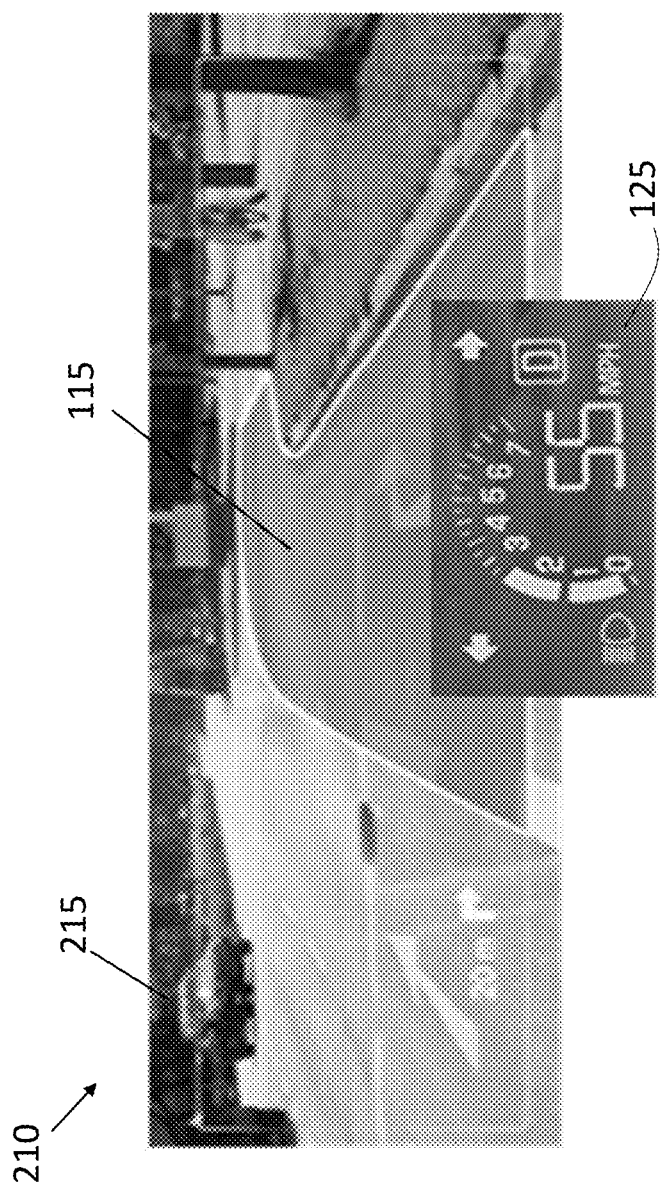
FIG. 2 illustrates a view of the viewer V based on the viewer input-based control in a multi-image AR HUD system of the vehicle according to one or more embodiments.

As illustrated in FIG. 2, the far-plane image 125 may be an AR image that augments what the viewer V sees (e.g., road surface ahead). A controller 130 is indicated as a source of the near-plane image 125 and far-plane image 115. The controller 130 may include a picture generating unit (PGU) and other known components to generate and project images that result in the near-plane image 125 and the far-plane image 115. The driver is shown with a device 150 (e.g., key fob, phone) that may be used to identify the viewer V and set initial heights for the near-plane image 125 and far-plane image 115 according to a previous interaction with the viewer V. The identification may be performed by a vehicle controller 155 while the control of the initial heights of the near-plane image 125 and far-plane image 115 may be performed by the controller 130. The vehicle controller 155 and controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The controller 130 projects the near-plane image 125 onto a rotatable mirror 120 and the rotatable mirror 120 reflects the near-plane image 125 onto the windshield for display at the height and location indicated in FIG. 1. The rotation of the rotatable mirror 120, which controls a height at which the near-plane image 125 is displayed, is controlled by a mirror controller 140 that the viewer V may operate. This rotational angle of the rotatable mirror 120 is provided to the controller 130, according to exemplary embodiments, based on a setting of the mirror controller 140 or the rotatable mirror 120 itself.

Similarly, the controller 130 projects the far-plane image 115 onto a fixed mirror 110 and the fixed mirror 110 reflects the far-plane image 115 onto the windshield for display at the height and location indicated in FIG. 1. Unlike the rotatable mirror 120 whose height is controlled by the viewer V via the mirror controller 140, the fixed mirror 110 is stationary and is curved. The position at which the far-plane image 115 is displayed is controlled by the position along the curve of the fixed mirror 110 at which the controller 130 projects the far-plane image 115. The size of the far-plane image 115 may also be adjusted by the controller 130 based on the position. As previously noted, eye tracking is used in prior systems to determine a height of the eyes of the viewer V, and the result of the eye tracking determines the position on the fixed mirror 110 at which the far-plane image 115 is projected. According to one or more embodiments, eye tracking is not necessary.

Instead, embodiments detailed herein involve viewer input-based control of the height of the far-plane image 115. According to an exemplary embodiment, the height of the eye may be estimated from the height of the near-plane image 125 that is controlled by the viewer V. The height of the eye of the viewer V is then used to control the height of the far-plane image 115 in a similar way that eye tracking is used in prior systems. According to additional or alternate embodiments, the height of the far-plane image 115 is adjusted based on feedback from the viewer V and may also be adjusted based on position changes (e.g., slouching) perceived during travel. One or more sensors 145 may be used to perceive the changes in position of the viewer V during travel and provide that information to the controller 130. For example, one exemplary sensor 145 shown in FIG. 1 may be a pressure sensor in the seat 146 that detects a change in center of gravity (i.e., slouching). This may result in lowering of the far-plane image 115 by 5 to 10 millimeters (mm), for example.

FIG. 2 illustrates a view 210 of the viewer V based on the viewer input-based control in a multi-image AR HUD system 105 of the vehicle 100 according to one or more embodiments. The viewer V sees the view 210 through the windshield 135 of the vehicle 100, for example. A near-plane image 125 and a far-plane image 115 are both HUD displays projected onto the real-world view 215. In the exemplary illustration, the real-world view 215 includes a car, a bicyclist, and a roadway. The near-plane image 125 is a HUD display that indicates the speed, current gear, and headlight status. The far-plane image 115 is an AR HUD display in the form of a highlight of a portion of the roadway indicating a right turn. If the height of this far-plane image 115 were not aligned to the height of the eye of the viewer V and, thus, the height of the real-world view 215 seen by the viewer V, then the far-plane image 115 would not highlight the roadway and turn correctly. For example, the turn may be shown too low (i.e., into the median) or too high (i.e., after the actual turn of the roadway).

Figure 3:
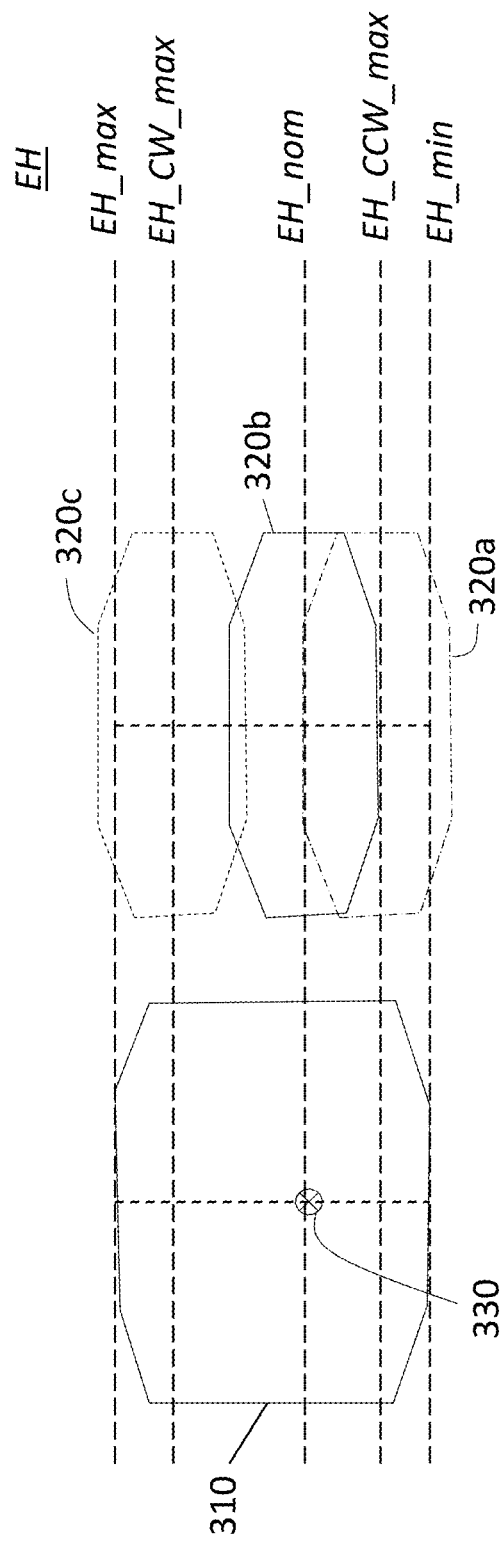
FIG. 3 illustrates an exemplary mechanism for viewer input-based control in a multi-image AR HUD system of a vehicle according to one or more embodiments.

FIG. 3 illustrates an exemplary mechanism for viewer input-based control in a multi-image AR HUD system 105 of a vehicle 100 according to one or more embodiments. A correspondence between the rotational angle of the rotatable mirror 120 and the projection position 330 on the fixed mirror 110 is discussed. As previously noted, the rotational angle of the rotatable mirror 120, which may be adjusted by the viewer V using the mirror controller 140, controls the height at which the near-filed image 125 is displayed. According to one or more embodiments, the display height of the near-plane image 125 is used to estimate the height of the eyes of the viewer V. This estimated eye height is used in the same way that eye tracking results are used in prior systems to then control a position at which the far-plane image 115 is displayed and to control a size of the far-pane image 115 based on the position.

A far-plane eye box 310 and three near-plane eye boxes 320a, 320b, 320c (generally referred to as 320) are shown. The far-plane eye box 310 represents an area in space within which the viewer V can see the full far-plane image 115, and each of the near-plane eye boxes 320 represents an area in space within which the viewer V can see the full near-plane image 125. The center of each of the three exemplary near-plane eye boxes 320 corresponds to a different eye height (EH) of the viewer V, as indicated. The center of the near-plane eye box 320b corresponds to the default position, where the rotational angle is zero degrees, and is at the nominal eye height (EH_nom). The near-plane eye box 320 can be moved among the exemplary locations shown in FIG. 3 by rotating the rotatable mirror 120 to correspond with a different eye height (EH) of the viewer V.

A minimum eye height (EH_min) and a maximum eye height (EH_max) are indicated, along with the nominal eye height (EH_nom) that is between the two. Nominal is used to refer to a predefined eye height (e.g., mean of EH_min and EH_max). A viewer V whose eyes are at a height above the maximum eye height EH_max or at a height below the minimum eye height EH_min, may not be able to properly see the near-plane image 115 and far-plane image 125. The actual heights may vary based on the vehicle 100. For example, the difference between EH_min and EH_max may be on the order of 100 millimeters (mm). Eye heights that correspond to the maximum counter clockwise rotation (EH_CCW_max) and maximum clockwise rotation (EH_CW_max) of the rotatable mirror 120 are also indicated.

For example, a viewer V whose eyes are at the minimum eye height EH_min will adjust the rotatable mirror 120 to the maximum counter clockwise rotation to most clearly see the near-plane image 125. This rotational position of the rotatable mirror 120 will locate the near-field image 125 such that it is fully visible within the instantaneous near-plane eye box 320a, which is centered at EH_CCW. Similarly, a viewer V whose eyes are at the maximum eye height EH_max will adjust the rotatable mirror 120 to the maximum clockwise rotation to most clearly see the near-plane image 125. This rotational position of the rotatable mirror 120 will locate the near-field image 125 such that it is fully visible within the instantaneous near-plane eye box 320c, which is centered at EH_CW. A viewer V whose eyes are at the nominal eye height (EH_nom) indicated in FIG. 3 will adjust the rotatable mirror 120 to a zero rotational angle to locate the near-field image 125 such that it is fully visible within the eye box 320b, which is centered at EH_nom.

As FIG. 3 indicates, the far-plane image 115 is always visible when the eyes of the viewer V are located within the single far-plane eye box 310. However, when the eye height EH of the viewer V within the far-plane eye box 310 is not known, the far-plane image 115 may be misaligned. That is, when the far-plane image 115 is an AR HUD image (e.g., the lane overlay as shown in FIG. 2), the alignment of the far-plane image 115 onto the real-world view 215 may not be correct without information about the eye height EH of the viewer V. By knowing the eye height EH of the viewer V within the far-plane eye box 310, the controller 130 can control the position and size of the far-plane image 115 such that, for example, the AR lane overlay shown in FIG. 2 aligns correctly with the right-turn lane in the real-world view 215.

According to one or more embodiments, the eye height EH of the viewer V is inferred based on adjustment of the rotatable mirror 120 to affect the near-plane image 125. For example, if the viewer V adjusts the mirror controller 140 such that the rotatable mirror 120 rotational angle is zero, this rotational angle corresponds with the nominal eye height EH_nom and near-plane eye box 320b. Thus, in this case, the eye height of the viewer V may be inferred to be at or around EH_nom. Then, as indicated in FIG. 3, the corresponding eye height position 330 within the far-plane eye box 310 may be used by the controller 130 to determine the position and size of the far-plane image 115. The controller 130 may map the rotational angle of the rotatable mirror 120, which is controlled by the viewer V via adjustment of the mirror controller 140, to an eye height EH of the viewer V (to be used as the eye height position 330 for purposes of positioning and sizing the far-plane image 115) based on a look-up table (LUT), for example.

According to additional or alternate embodiments, the eye height EH of the viewer V (i.e., corresponding eye height position 330) that the controller 130 uses to determine the position and size of the far-plane image 115 may be adjusted based on other information. As previously noted, sensors 145 (e.g., pressure sensor in the seat 146) may detect movement by the viewer V (e.g., slouching) that affects eye height EH. Thus, for example, the position and/or size of the far-plane image 115 may be adjusted based on a predefined amount (e.g., 5 to 10 mm) of change in eye height EH when a sensor 145 indicates that the viewer V is slouching in the seat 146. As also previously noted, feedback may be requested from the viewer V through the infotainment system controlled by the vehicle controller 155, for example. The feedback (e.g., a response selection of "no, too high" to a query asking "was the navigation turn arrow at the correct location?") may be used to store adjustments to the estimated eye height position 330 and, thus, to the position and size of the far-plane image 115.

Figure 4:
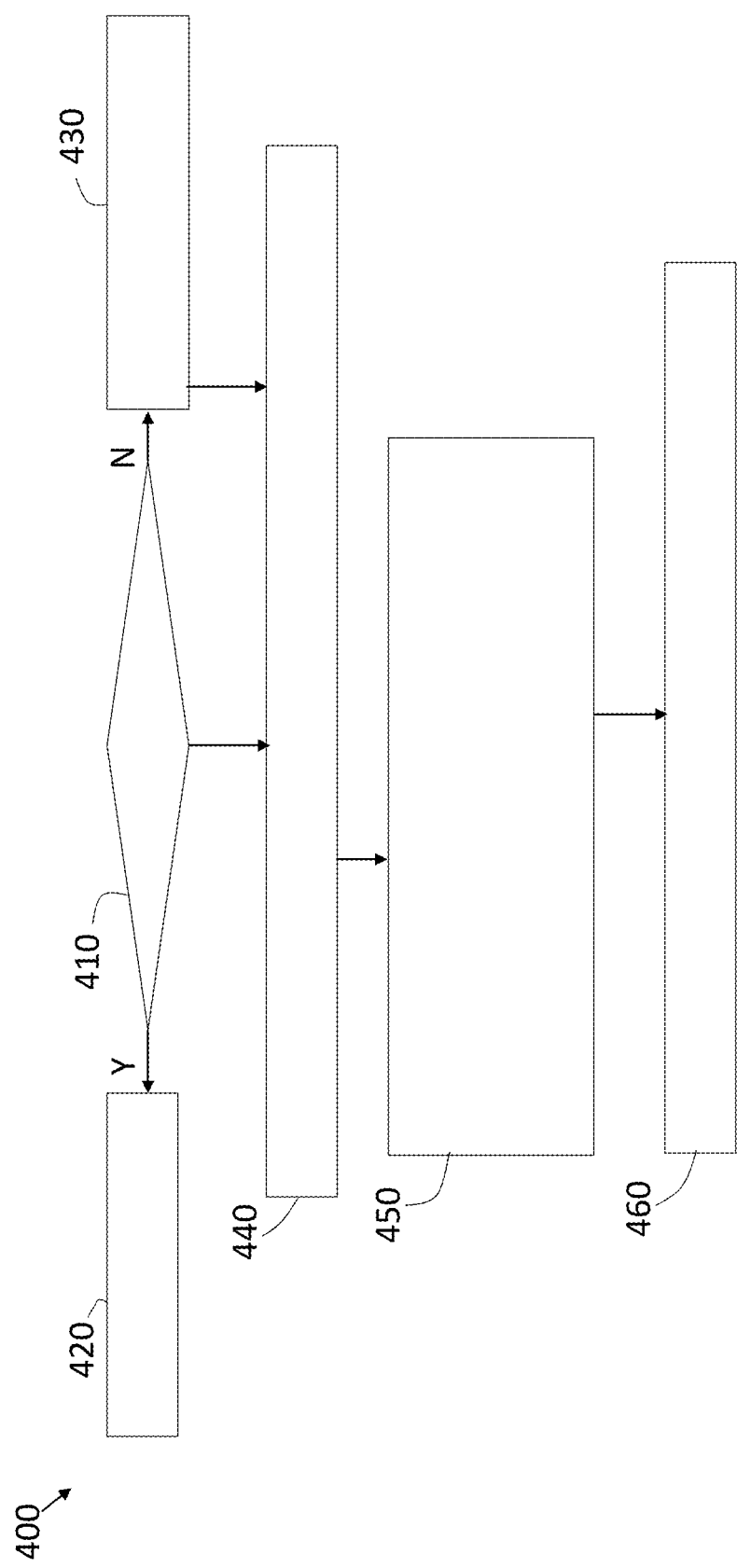
FIG. 4 is a process flow of a method of performing viewer input-based control in a multi-image AR HUD system of a vehicle according to one or more embodiments.

FIG. 4 is a process flow of a method 400 of performing viewer input-based control in a multi-image AR HUD system 105 of a vehicle 100 according to one or more embodiments. The processes shown in FIG. 4 may be initiated when the vehicle 100 is started or when the multi-image AR HUD system 105 is initiated during travel. At block 410, a check is done of whether viewer V settings are stored. This check may involve determining if the viewer V possesses a device 150 (e.g., key fob, phone) that identifies the viewer V. This determination may be done by the vehicle controller 155, for example. If the viewer V is identified, the controller 130 may then determine if the identified viewer V is associated with a stored eye height EH (and corresponding eye height position 330 within the far-plane eye box 310) for the near-plane image 125 and the far-plane image 115.

If the viewer V is identified and associated with a stored eye height EH, at block 410, then obtaining the stored eye height EH, at block 420, is performed. If the viewer V is either not identified or not associated with a stored eye height EH, at block 410, then obtaining a nominal eye height EH, at block 430, is performed. Based on the check at block 410, either the stored eye height EH (from block 420) or nominal eye height EH (from block 430) is set as the initial eye height EH (and corresponding eye height position 330 within the far-plane eye box 310) for rendering the images 115, 125. At block 440, the processes include displaying the near-plane image 125 and the far-plane image 115 based on the initial eye height EH.

At block 450, a viewer input-based modification to the display position, which may also result in a change in size, of the far-plane image 115 is determined. As previously noted, the position of the far-plane image 115 may be modified based on several forms of viewer input. One type of viewer input-based modification is based on an adjustment to the mirror controller 140. As discussed with reference to FIG. 3, the rotational angle of the rotatable mirror 120 (controlled by the mirror controller 140) has a known mapping to a particular eye height EH (i.e., a particular eye box 320). As shown in FIG. 3, the eye height EH that corresponds to the near-plane eye box 320 that is selected by the viewer V for the near-plane image 125 may then be mapped to a particular eye height position 330 in the far-plane eye box 310. The position and size of the far-plane image 115 is then adjusted to this new eye height position 330.

At block 450, another type of viewer input-based modification to the height at which the far-plane image 115 is displayed is based on data from a sensor 145. The previously discussed example is of a pressure sensor 145 that senses that the viewer V has slouched in the seat 146. This may lead to lowering of the eye height position 330. At block 450, yet another type of viewer input-based modification to the height at which the far-plane image 115 is displayed is based on feedback from the viewer V. The vehicle controller 155 may provide queries to the viewer V via an infotainment system or through the device 150 (e.g., phone) carried by the viewer V, for example. The response to the queries may result in an increase or a decrease in the eye height position 330. The queries may be presented iteratively such that increases or decreases by the predefined amount are repeated until the viewer V indicates that the position of the far-plane image 115 is satisfactory.

At block 460, the processes include storing any adjustments based on the source of the adjustment. That is, if the viewer input that resulted in an adjustment to the position at which the far-plane image 115 is displayed is an adjustment to the height at which the near-plane image 125 is displayed (via the mirror controller 140), then the adjustments for both the near-plane image 125 and the far-plane image 115 are stored. If the viewer input that resulted in an adjustment to the height at which the far-field image 115 is displayed is sensor-based, then the viewer V may be asked whether to store the adjusted height. For example, if the viewer V was slouching due to tiredness, the adjustment may not need to be stored for subsequent travel. If the viewer input that resulted in an adjustment to the position at which the far-plane image 115 is displayed is feedback from the viewer V, then the adjusted position resulting from the feedback is stored.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system to provide a multi-image head up display (HUD) in a vehicle, the system comprising:
   a fixed mirror configured to project a far-plane image at a first distance from an occupant of the vehicle, wherein control of a position of display of the far-plane image is based on an eye height position of the occupant;
   a rotatable mirror configured to project a near-plane image at a second distance, closer than the first distance, from the occupant, wherein control of a position of display of the near-plane image is based on a manual adjustment of a rotational angle of the rotatable mirror by the occupant; and
   processing circuitry configured to infer the eye height position of the occupant from the rotational angle of the rotatable mirror, wherein the rotational angle of the rotatable mirror controls the position of display of the near-plane image and is adjusted manually, and to automatically adjust the position of the fixed mirror according to the inferred eye height position, wherein the position of the fixed mirror controls the position of display of the far-plane image.

2. The system according to claim 1, wherein the processing circuitry is further configured to map a rotational angle of the rotatable mirror to the eye height position.

3. The system according to claim 2, wherein the processing circuitry is configured to use the eye height position mapped from the rotation angle of the rotatable mirror to control the position and a size of the display of the far-plane image.

4. The system according to claim 2, further comprising a mirror controller operable by the occupant to control the rotational angle of the rotatable mirror.

5. The system according to claim 1, further comprising a vehicle controller configured to obtain feedback from the occupant.

6. The system according to claim 5, wherein the processing circuitry is configured to automatically increase or decrease the eye height position used to control the display of the far-plane image based on the feedback from the occupant.

7. The system according to claim 1, further comprising one or more sensors configured to obtain position information of the occupant.

8. The system according to claim 7, wherein the one or more sensors includes a pressure sensor configured to obtain information indicating a decrease in eye height of the occupant.

9. The system according to claim 8, wherein the processing circuitry is configured to automatically decrease the eye height position used to control the position of the display of the far-plane image by a predefined amount based on the information from the pressure sensor.

10. The system according to claim 1, wherein the eye height position that controls the position of the display of the far-plane image is stored for a subsequent display of the far-plane image.

11. A method of providing a multi-image head up display (HUD) in a vehicle, the method comprising:
positioning a fixed mirror to project a far-plane image at a first distance from an occupant of the vehicle, wherein control of a position of display of the far-plane image is based on an eye height position of the occupant;
disposing a rotatable mirror to project a near-plane image at a second distance, closer than the first distance, from the occupant, wherein control of a position of display of the near-plane image is configured to be based on a manual adjustment of a rotational angle of the rotatable mirror by the occupant; and
configuring processing circuitry to infer the eye height position of the occupant from the rotational angle of the rotatable mirror, wherein the rotational angle of the rotatable mirror controls the position of display of the near-plane image and is adjusted manually, and to automatically adjust the position of the fixed mirror according to the inferred eye height position, wherein the position of the fixed mirror controls the position of display of the far-plane image.

12. The method according to claim 11, further comprising configuring the processing circuitry to map a rotational angle of the rotatable mirror to the eye height position.

13. The method according to claim 12, further comprising configuring the processing circuitry to use the eye height position mapped from the rotation angle of the rotatable mirror to control the position and a size of the display of the far-plane image.

14. The method according to claim 12, further comprising arranging a mirror controller operable by the occupant to control the rotational angle of the rotatable mirror.

15. The method according to claim 11, further comprising configuring a vehicle controller to obtain feedback from the occupant.

16. The method according to claim 15, further comprising configuring the processing circuitry to automatically increase or decrease the eye height position used to control the display of the far-plane image based on the feedback from the occupant.

17. The method according to claim 11, further comprising disposing one or more sensors to obtain position information of the occupant.

18. The method according to claim 17, wherein the one or more sensors includes a pressure sensor and the method includes configuring the pressure sensor to obtain information indicating a decrease in eye height of the occupant.

19. The method according to claim 18, further comprising configuring the processing circuitry to automatically decrease the eye height position used to control the position of the display of the far-plane image by a predefined amount based on the information from the pressure sensor.

20. The method according to claim 11, further comprising storing the eye height position that controls the position of the display of the far-plane image for a subsequent display of the far-plane image.

\* \* \* \* \*